(12) United States Patent
Guzman

(10) Patent No.: US 8,788,274 B1
(45) Date of Patent: Jul. 22, 2014

(54) LANGUAGE CONVERTER AND TRANSMITTING SYSTEM

(76) Inventor: Jose Estevan Guzman, Hollister, CA (US)

( * ) Notice: Subject to any disclaimer, the term of this patent is extended or adjusted under 35 U.S.C. 154(b) by 3893 days.

(21) Appl. No.: 10/613,255

(22) Filed: Jul. 3, 2003

(51) Int. Cl.
*G10L 21/00* (2013.01)

(52) U.S. Cl.
USPC ........................................... 704/277

(58) Field of Classification Search
USPC ....................................... 704/8, 277
See application file for complete search history.

(56) References Cited

U.S. PATENT DOCUMENTS

| | | | |
|---|---|---|---|
| 3,862,379 A | 1/1975 | Pless | |
| 4,882,681 A * | 11/1989 | Brotz ................................ | 704/3 |
| 4,959,828 A | 9/1990 | Austin | |
| 5,152,003 A * | 9/1992 | Poch ............................... | 455/18 |
| 5,412,712 A * | 5/1995 | Jennings .................... | 379/88.05 |
| 5,615,301 A | 3/1997 | Rivers | |
| 5,826,234 A | 10/1998 | Lyberg | |
| D410,228 S | 5/1999 | Jones | |
| 6,161,082 A * | 12/2000 | Goldberg et al. .................. | 704/3 |
| 7,353,166 B2 * | 4/2008 | Li et al. .............................. | 704/8 |
| 2001/0056342 A1 | 12/2001 | Piehn et al. | |
| 2002/0169592 A1 * | 11/2002 | Aityan .............................. | 704/2 |

* cited by examiner

*Primary Examiner* — Angela A Armstrong

(57) ABSTRACT

A language converter and transmitting system includes a processor adapted for converting the first language into a plurality of secondary languages. An audio input is operationally coupled to the processor. An audio output of a media source may be operationally coupled to the audio input. A wireless transmitter is operationally coupled to the processor for transmitting each of the secondary languages. Each of the secondary languages is transmitted on one of a plurality of frequencies. Each of a plurality of receiving devices includes a receiver for receiving signals from the wireless transmitter. A tuner for selecting one of the plurality of frequencies is operationally coupled to the receiver. A sound emitter for emitting an audible sound is operationally coupled to the tuner. The tuner may be used to select one of said plurality of frequencies such that one of the plurality of secondary languages is emitted through the sound emitter.

4 Claims, 2 Drawing Sheets

US 8,788,274 B1

LANGUAGE CONVERTER AND TRANSMITTING SYSTEM

BACKGROUND OF THE INVENTION

1. Field of the Invention

The present invention relates to language converters and more particularly pertains to a new language converter for converting a first language from a media source into a plurality of languages and transmitting the plurality of secondary languages.

2. Description of the Prior Art

The use of language converters is known in the prior art. However, while these devices fulfill their respective, particular objectives and requirements, the need remains for a system that transmits these converted languages in a useful way so that persons having different language proficiencies may enjoy the same movie experience.

SUMMARY OF THE INVENTION

The present invention meets the needs presented above by comprising a system for converting a first language from a media source into a plurality of secondary languages. The system includes a processor adapted for converting the first language into a plurality of secondary languages. An audio input is operationally coupled to the processor. An audio output of the media source may be operationally coupled to the audio input such that the processor receives the first language. A wireless transmitter is operationally coupled to the processor for transmitting each of the plurality of secondary languages. Each one of the plurality of secondary languages is transmitted on one of a plurality of frequencies. Each of a plurality of receiving devices includes a receiver for receiving signals from the wireless transmitter. A tuner for selecting one of the plurality of frequencies is operationally coupled to the receiver. A sound emitter for emitting an audible sound is operationally coupled to the tuner. The tuner may be used to select one of said plurality of frequencies such that one of the plurality of secondary languages is emitted through the sound emitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
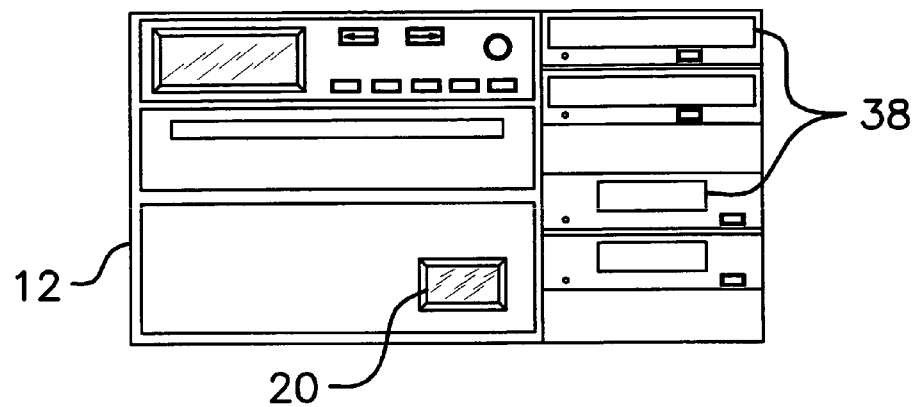
FIG. 1 is a schematic front view of a language converter and transmitting system according to the present invention.
Figure 2:
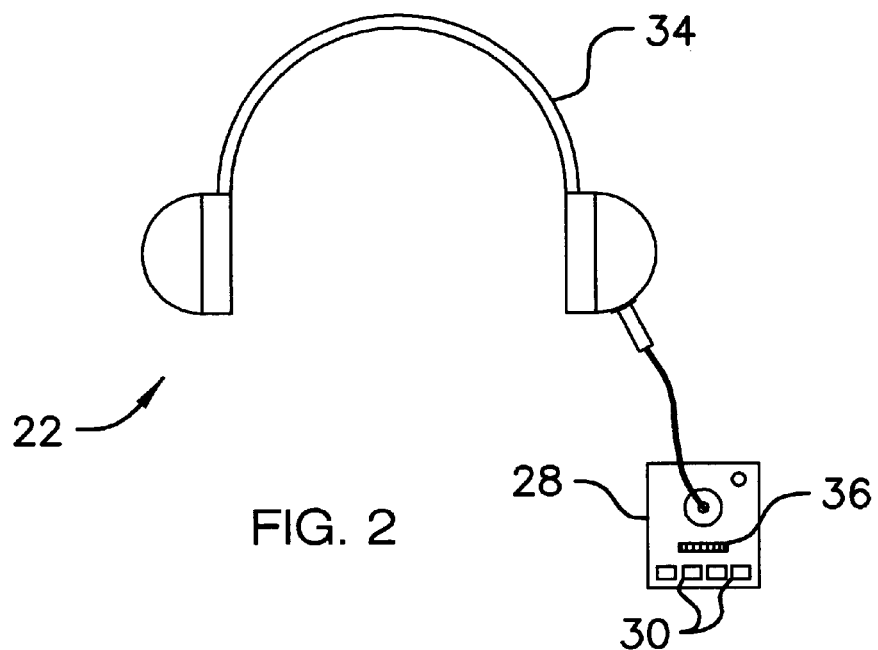
FIG. 2 is a schematic front view of a receiving device of the present invention.
Figure 3:
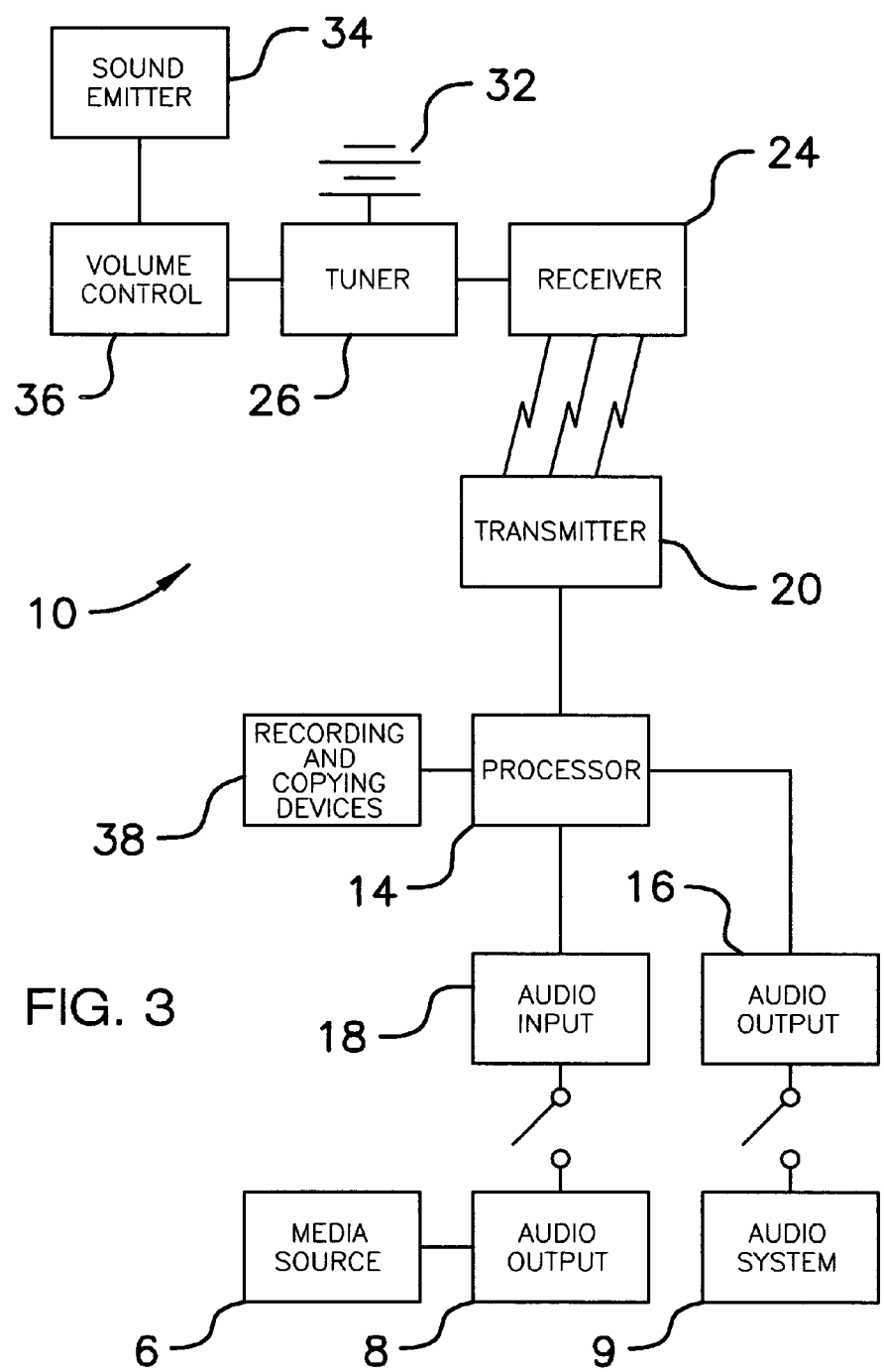
FIG. 3 is an electronic schematic view of the present invention.

With reference now to the drawings, and in particular to FIGS. 1 through 3 thereof, a new language converter embodying the principles and concepts of the present invention and generally designated by the reference numeral 10 will be described.

As best illustrated in FIGS. 1 through 3, the language converter and transmitting system 10 generally comprises a system for converting a first language from a media source into a plurality of secondary languages. The media source 6 includes an audio output 8. The media source may comprise any electronic device such as a VCR, DVD player, or movie projector that includes an audio output.

The system may be embodied in a housing 12 as shown in FIG. 1 and includes a processor 14 adapted for converting the first language into a plurality of secondary languages. The processor 14 is conventional and may be programmed for the language conversions required. It is preferred that the first language is English and the secondary languages at least include Spanish, French, German, Italian and Japanese, though any language may be selected. An audio output 16 is preferably operationally coupled to the processor 14 to act as a through-put for the first language so that the first language may be operationally connected to an audio system, such as the audio system 9 of a movie theater.

An audio input 18 is operationally coupled to the processor 14 so that the audio output 8 of the media source 6 may be operationally coupled to the audio input 18 such that the processor 16 receives the first language. The first language is converted into the plurality of secondary languages by the processor 14.

A wireless transmitter 20 is operationally coupled to the processor 14 for transmitting each of the plurality of secondary languages. Each of the secondary languages is assigned a particular one of a plurality of frequencies. The transmitter 20 transmits the frequencies by either a radio signal or an infrared signal.

A plurality of receiving devices 22, only one of which is shown, is used for receiving the signals sent by the transmitter. Each of the receiving devices 22 includes a receiver 24 for receiving signals from the wireless transmitter 20 and a tuner 26, which is operationally coupled to the receiver 24, for selecting one of the plurality of frequencies. The tuner 26 may be analog but is preferably a digital tuner. The receiver 24 and tuner 26 are preferably enclosed within a housing 28 having a plurality of actuators 30 thereon for selecting the desired frequency. A power supply 32, which is preferably comprised of one or more batteries, are positioned within the housing 28 and are operationally coupled to the tuner 26. Each of the receiving devices 22 includes a sound emitter 34 for emitting an audible sound. The sound emitter 34 is operationally coupled to the tuner 26 and preferably includes a pair of headphones. Ideally, a volume control 36 is operationally coupled to the sound emitter 34 for selectively increasing or decreasing a sound output of the sound emitter 34.

Optionally, compact disc, DVD and MP3 recording and copying devices 38 may be operationally coupled to the processor 14 to record the secondary languages for later playback. Since the processor 14 is converting the first language in real time, there are no timing issues when the playback of the second language is played if it is accompanying a video or other visual presentation.

In use, an audio output 8 of a media source 6, such as a movie projector, is operationally coupled to the audio input 18 of the system 10. The processor 14 receives the first language and converts it to a plurality of secondary languages. Members of an audience who are viewing movie being shown by the movie projector, but who do not fully comprehend the first language, may use one of the receiving devices 22. This is done by placing the headphones 34 over their ears and using the tuner 26 to select the frequency corresponding with the secondary language which they wish to have emitted through the sound emitter 34. The system 10 allows a plurality of moviegoers to listen to the movie even though each moviegoer may speak a different language.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A language converting system including:
   a media source providing a first language, said media source including an audio output;
   in a single housing;
      a processor adapted for converting the first language into a plurality of secondary languages;
      an audio input being operationally coupled to said processor, wherein the audio output of the media source may be operationally coupled to said audio input such that said processor receives the first language;
      a wireless transmitter being operationally coupled to said processor for transmitting each of said plurality of secondary languages, each one of said plurality of secondary languages being transmitted on one of a plurality of frequencies;
   a plurality of receiving devices, each of said receiving devices including;
      a receiver for receiving signals from said wireless transmitter;
      a tuner for selecting one of said plurality of frequencies, said tuner being operationally coupled to said receiver;
      a sound emitter for emitting an audible sound being operationally coupled to said tuner; and
      wherein said tuner may be used to select one of said plurality of frequencies such that one of said plurality of secondary languages is emitted through said sound emitter.

2. The system of claim 1, further including an audio output being operationally coupled to said processor for selectively transmitting said first language from said processor.

3. The system of claim 1, wherein said sound emitter comprises a pair of headphones.

4. The system of claim 1, further including a volume control being operationally coupled to said sound emitter.

* * * * *